Patented Apr. 21, 1942

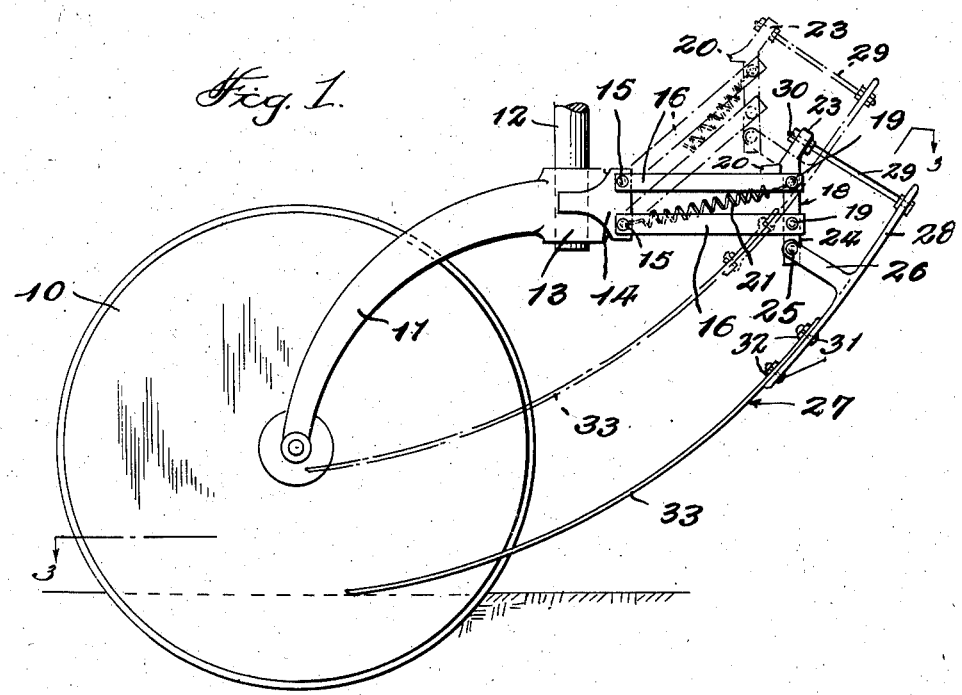
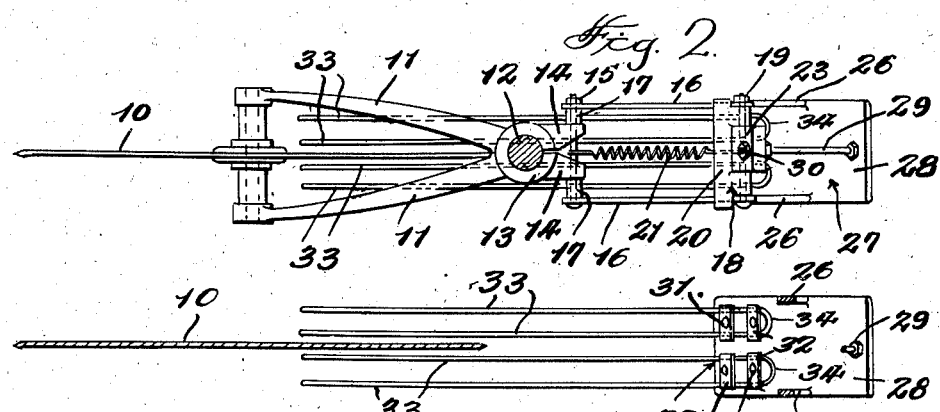
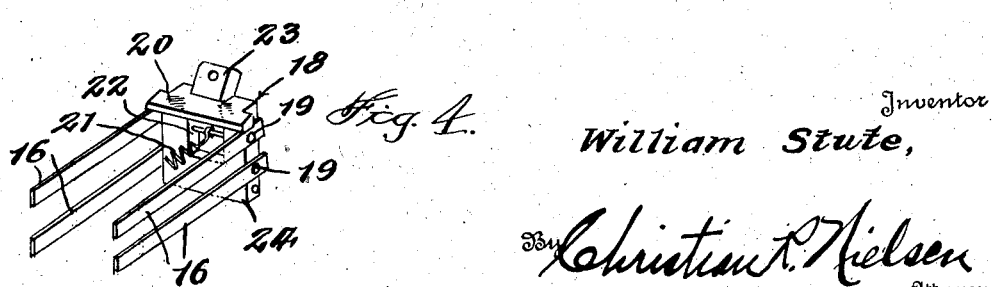

2,280,107

UNITED STATES PATENT OFFICE 2,280,107

ATTACHMENT FOR ROLLING COLTERS

William Stute, Varna, Ill.

Application March 20, 1941, Serial No. 384,378

2 Claims. (Cl. 97—209)

This invention relates to an attachment for colters for plows and more particularly to a means for leveling vegetation to a position to be readily cut or severed by the colter wheel for ready plowing under, this forming fertilization of the ground, and it consists in the constructions, arrangements and combinations herein described and claimed.

It is a particular object of the invention to provide a sweep device adapted to move vegetation into the path of the colter wheel so as to be cut thereby and embodying means to maintain the vegetation in firm relation with the ground to permit cutting of the vegetation in the normal operation of a plow.

It is a still further object of the invention to provide a means for uniformly leveling vegetation upon opposite sides of a colter wheel, in order that the colter wheel may readily sever the vegetation for plowing under, as fertilization and be readily attachable to plows of conventional constructions.

Additional objects, advantages and features of invention will be apparent from the following description and accompanying drawing, wherein Figure 1 is a fragmentary side elevation of my attachment as applied to a plow in advance of the colter wheel.

Figure 2 is a top plan view thereof.

Figure 3 is a sectional view on the line 3—3 of Figure 1.

Figure 4 is a fragmentary perspective view of a detail of the sweep mounting means.

There is illustrated a colter wheel 10 revolubly supported by forked arms 11 fixed to a downwardly extended shank 12 of a plow, as well understood in the art.

In the present instance, the arms 11 are secured to the shank 12 by means of a split collar 13 having parallel projecting lugs 14 receiving a pair of bolts 15, vertically spaced for clamping the collar firmly upon the shank 12. The bolts 15 also function for supporting my attachment now to be described.

Upon each side of the lugs 14, there are swingably mounted, in a vertical direction, by each bolt 15, a strap arm 16 of suitable strength for the purposes intended, each arm being spaced by bearings 17 as clearly shown in Figure 2, so as to permit free up and down swinging movements of the arms, yet permit sufficient compressive action upon the lugs 14 to hold the collar 13 rigidly upon the shank 12.

The mounting of the arms 16 may vary, according to the differing constructions of plow and colter wheel mounting constructions, but in any event, the free ends of the arms 16 pivotally mount a head member 18 by means of respective bolts 19.

The head member 18, as clearly shown in Figure 4, consists of a substantially rectangular steel block having a width snugly received between the arms 16, and at the upper horizontal edge thereof there is a rearwardly extended lip 20 adapted to engage the upper arms 16 when the latter are in normal or operative positions. As will be readily understood from consideration of Figures 1 and 4, the relation of the lip 20 with respect to the arms 16 limit downward swinging movements of the head.

It is essential that the head 18 be held yieldingly in normal position, and to this end a helical spring 21 is illustrated, one end of which is anchored to the lowermost bolt 15, while the other end of the spring is secured to the uppermost bolt 19 of the head 18, and in order that this latter connection may be accomplished, the head 18 is cut away as at 22 (see Figure 4).

The upper end of the head 18 has an angular forwardly directed lug 23, suitably apertured for a purpose presently to be explained, and the lower end of the head is extended below the lowermost arm 16, as at 24, the extended portion having a transversely extended aperture for reception of a bolt 25 for pivotal mounting arms 26 of the sweep device generally indicated at 27, now to be described.

The sweep device 27 comprises a substantially rectangular steel plate 28 slightly arcuate longitudinally, and of a width to position the arms 26, which are integrally formed therewith in alinement with the vertical edges of the head 18.

The upper end of the plate 28 has mounted thereon a bolt 29, the bolt being positioned in the medial longitudinal axis of the plate and of a length to be extended through the aperture of the lug 23. Lock nuts 30 on the bolt are arranged above and below the lug 23, for the purpose of adjusting the sweep with relation to the ground upon which the plow and colter are operating, as will be explained hereinafter.

The lower end of the plate 28 is provided with a pair of threaded apertures equally arranged from the medial longitudinal axis of the plate, and in each of the apertures there is threaded a bolt 31, for mounting a clamping bar 32, for retaining sweep arms 33.

In the present instance, the sweep arms 33 are shown as formed from a single strand of spring steel, bent intermediate its length, forming a bight portion 34 and from which the arms 33 are extended.

Two pairs of sweep arms 33 are here shown, and as clearly illustrated in Figure 3, the bight portion 34 is positioned above the uppermost bolt 31 and the arms 33 pass beneath the clamping bars 32. Obviously, by tightening the bolts 31 the clamp bars will secure the arms rigidly to the plate.

It should be noted that a sweep arm 33 is positioned upon both sides of the colter wheel 10 by the construction presented, and thus vegetation in the path of the colter wheel will be positively gripped due to spring action of the arms themselves, as well as the spring 21 to hold the vegetation upon the ground for ready severing by the colter wheel.

In the plowing under of certain crops or standing stalks, the vegetation is of greater bulk than in other crops and it is therefore desirable to have means for regulating the tension of the sweep arms 33. This may be accomplished by loosening the lock nuts 30 and adjusting the bolts 29 so as to either raise or lower the sweep arms 33, when the nuts may be again tightened.

In the event that an excessive amount of trash or vegetation should accumulate beneath the arms, or should a stump or rock be encountered, strain on the arms, head, etc., is not excessive, since the sweep arms 33, the head 18 and the arms 16 may partake an upward swinging movement as indicated by dotted lines in Figure 1, so as to free the obstruction. The spring 21 functions to return the parts to normal operative position and the lip 20 stops movement of the parts beyond normal position.

While I have shown and described specifically the invention, this is by way of illustration only, and I consider as my own all such modifications in structure as fairly fall within the scope of the appended claims.

I claim:

1. In a colter having a cutting edge and supporting means for the colter, pivoted spaced parallel arms on the supporting means extending forwardly of the colter, a head member mounted between the arms at their forward ends, spring means connected between a low portion on the supporting means and a high point on the head to hold the head and arms in normal operative position, stop means between the arms and head for limiting the action of the spring, a pair of sweep arms pivotally connected to the head, and adjusting means between the sweep arms and the head.

2. In a colter having a cutting and supporting means for the colter, lugs on the supporting means having a pair of vertically spaced apertures, a bolt in each aperture, an arm pivoted on each bolt and extended forwardly of the colter, a head member pivotally connected between the arms, a lip on the head adapted to engage a pair of arms to limit movement of the head in one direction, a helical spring connected between a low point on the supporting means and a high point on the head for maintaining the head in normal operative position, said head member having an angularly arranged lug at its upper part and an extension at its lower part, the lug having an aperture therethrough, a plate member pivotally mounted to the extension for vertical swinging movements, said plate member having a pair of spring arms positioned upon opposite sides of the colter, a bolt carried by the upper end of the plate and extended through the aperture of the lug, and lock nuts on the bolt cooperative with the lug to maintain adjustment of the plate and the sweep arms.

WILLIAM STUTE.